United States Patent [19]

Sauer

[11] Patent Number: 5,094,493

[45] Date of Patent: Mar. 10, 1992

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 345,652

[22] Filed: May 1, 1989

[30] Foreign Application Priority Data

May 4, 1988 [DE] Fed. Rep. of Germany ....... 3815168

[51] Int. Cl.$^5$ ............................................. F16L 33/20
[52] U.S. Cl. .................................. 285/256; 285/319; 285/921
[58] Field of Search ............... 285/921, 256, 319, 242, 285/314, 257, 259

[56] References Cited

U.S. PATENT DOCUMENTS

| | | | |
|---|---|---|---|
| 2,797,111 | 6/1957 | Beuzley | 285/256 X |
| 3,933,406 | 1/1976 | Cameron et al. | 285/921 X |
| 4,730,856 | 3/1988 | Washizu | 285/921 X |
| 4,753,458 | 6/1988 | Case et al. | 285/921 X |

Primary Examiner—Dave W. Arola
Attorney, Agent, or Firm—Peter K. Kontler

[57] ABSTRACT

A coupling which serves to fluidtightly and separably connect the nipple at one end of a pipe with an end portion of a flexible hose has a sleeve with a first section which is insertable into the end portion of the hose and a second section form-lockingly or integrally connected with the first section and provided with axially parallel flexible prongs having openings for reception of discrete projections at the exterior of the nipple. A tubular clamping member is or can be integrally connected to and cooperates with the first section of the sleeve to sealingly engage the end portion of the hose. One or more sealing rings are inserted between the sleeve and the exterior of the nipple when the latter is received in the sleeve so that its projections enter or can enter the openings of the respective prongs.

16 Claims, 4 Drawing Sheets

Fig. 16

HOSE COUPLING

CROSS-REFERENCE TO RELATED CASES

The hose coupling of the present invention is similar to those which are disclosed in six commonly owned copending patent applications Ser. Nos. 07/345,635 (now U.S. Pat. No. 4,969,668 granted Nov. 13, 1990), 07/345,636, 07/345,632, 07/345,633, 07/345,680 (now U.S. Pat. No. 4,969,667 granted Nov. 13, 1990) and 07/345,679 (now U.S. Pat. No. 4,969,669 granted Nov. 13, 1990) of Heinz Sauer, all filed May 1, 1989.

BACKGROUND OF THE INVENTION

The invention relates to couplings in general, and more particularly to improvements in couplings which can be utilized to separably and fluidtightly connect an end portion of a first tubular component (such as a nipple at one end of a metallic or plastic pipe) with one end portion of a second tubular component (particularly with one end portion of a flexible elastic hose). Still more particularly, the invention relates to couplings of the type wherein a sleeve-like tubular coupling member is insertable into the end portion of the second component and has flexible coupling elements engageable with retainer means at the exterior of the end portion of the first component.

Commonly owned U.S. Pat. No. 4,775,173 to Sauer discloses a hose coupling wherein a cylindrical portion of the tubular coupling member is insertable into the end portions of the first and second tubular components and its median portion is provided with external coupling elements having pallets which can engage a radial flank provided on an external retaining rib of the end portion of the first tubular component. The coupling elements extend radially outwardly of the cylindrical portion and their pallets extend substantially axially and radially of the cylindrical portion in order to be capable of pivoting into engagement with the flank of the retaining rib when the cylindrical portion is properly inserted into the end portions of both tubular components. A clamping ring is provided to surround the end portion of the second component and to urge such end portion into sealing engagement with the inserted cylindrical portion of the coupling member. When the coupling is fully assembled, the coupling elements extend radially of the tubular components well beyond the retaining rib of the end portion of the first component. This contributes to the bulk of the coupling, and the pallets of the coupling elements are likely to be accidentally detached from the retaining rib. Moreover, when one of the coupledtogether components is pulled in a direction to move its end portion away from the end portion of the other component, the junctions between the coupling elements and the cylindrical portion of the coupling member are subjected to the action of torque which tends to disengage the pallets from the radial flank of the retaining rib. Still further, the coupling element of the patented coupling is expensive because it must be made in a specially designed plastic processing machine. In addition, the entire coupling member must be made of one and the same material. This contributes to the cost of the coupling because the cylindrical portion need not be elastic and, therefore, such cylindrical portion could be made of a less expensive ductile or rigid plastic material.

OBJECTS OF THE INVENTION

An object of the invention is to provide a novel and improved coupling, particularly a hose coupling, which is simpler and less expensive but more reliable and more compact than heretofore known couplings.

Another object of the invention is to provide a novel and improved coupling member for use in the above outlined coupling.

A further object of the invention is to provide a coupling which can stand pronounced axial stresses tending to separate the end portions of the first and second tubular components from each other and which can be used to properly connect coaxial or mutually inclined tubular components.

An additional object of the invention is to provide the coupling with novel and improved means for sealingly engaging and retaining the end portion of a flexible tubular component, particularly the end portion of an elastic hose.

Still another object of the invention is to provide the coupling with novel and improved means for reliably connecting its constituents to one another.

An additional object of the invention is to provide as coupling which can be used in connection with tubular components wherein the end portion of one of the components has discrete external projections for engagement with certain parts of the coupling.

Another object of the invention is to provide a novel and improved nipple for use with the above outlined coupling.

A further object of the invention is to provide a novel and improved method of reducing the likelihood of separation of a hose coupling from the end portions of tubular components which are coupled to each other.

An additional object of the invention is to provide a coupling which comprises a small number of discrete parts and which is less likely to be accidentally deactivated than heretofore known couplings.

Another object of the invention is to provide the coupling with novel and improved coupling elements which can attach a tubular coupling member to an end portion of one of the tubular components which are fluidtightly coupled to each other.

A further object of the invention is to provide a novel and improved composite coupling element which can be used in the above outlined coupling.

SUMMARY OF THE INVENTION

The invention is embodied in a coupling which can be used to separably and fluidtightly connect an end portion of a first tubular component, wherein the end portion has a plurality of external projections in the form of teeth or the like, with an end portion of a second tubular component. The improved coupling can be used with particular advantage to connect a nipple at one end of a pipe with an end portion of a flexible elastic hose and comprises a tubular coupling member including a tubular first section which is insertable into the end portion of the second component and a second section which includes a plurality of flexible coupling elements (especially substantially prong-shaped coupling elements) each having an opening (particularly a hole or bore extending substantially radially of the coupling member) for reception of a projection in response to insertion of the end portion of the first component into the coupling member. The coupling further comprises means for urging the end portion of the second component into sealing engagement with the exterior of the first section of the coupling member.

The second section is preferably an annular (washer-like or tubular) section, and the coupling elements are preferably at least substantially parallel to the axis of the second section.

The coupling further comprises at least one annular sealing element which is disposed within the coupling member and serves to sealingly engage the coupling member and the end portion of the first component when the end portion of the first component is inserted into the coupling member.

The coupling elements are preferably integral with the aforementioned annular (e.g., washer-like or tubular) portion of the second section of the coupling member.

The two sections of the coupling member can constitute two separately produced parts, and the coupling member then further comprises means (e.g., including the aforementioned urging means) for connecting the first and second sections to each other. Such connecting means is preferably designed to establish a form-locking connection between the first and second sections of the coupling member. The connecting means can comprise complementary first and second corrugations which are respectively provided on the first and second sections of the coupling member, and one of these corrugations is received in the other corrugation. One of the first and second corrugations can define in the respective section of the coupling member an internal annular groove for the aforementioned annular sealing element. The groove can be provided in the first section of the coupling member. The latter can be constructed, dimensioned and configurated in such a way that the entire first section and at least a portion of the second section (including portions of or the entire coupling elements) are receivable in the end portion of the second component. This ensures that the second component shields the coupling elements and reduces the likelihood of accidental separation of coupling elements from the respective projections at the exterior of the end portion of the first component.

The urging means can include a second tubular member which defines with the first section of the coupling member an annular space for the end portion of the second component. One axial end of the second tubular member can be integrally connected with one axial end of the second section by an annular wall which is disposed in a plane extending substantially at right angles to the axis of the coupling member and has apertures for the coupling elements of the second section. The latter can include a substantially discshaped or washer-like carrier which is disposed in the annular space adjacent the wall so that the coupling elements can extend through and beyond the apertures of the wall. The coupling elements are or can be integral with the carrier. The second tubular member and/or the first section of the coupling member includes means (e.g., one or more corrugations) for sealingly engaging the end portion of the second component upon insertion of such end portion into the annular space so that the inserted and clamped end portion of the second component can serve as a means for maintaining the carrier of the second section of the coupling member adjacent or in abutment with the wall which integrally connects the urging means with the first section of the coupling member.

The coupling elements can be made of a ductile metallic or plastic material and are flexible in directions substantially radially toward and away from the axis of the coupling member.

The means for form-lockingly connecting the separately produced first and second sections of the coupling member to each other can comprise a first corrugation which forms part of the second tubular member (which is integral with the first section) and a complementary second corrugation which forms part of the second section and extends into the first corrugation or vice versa. The arrangement may be such that the second corrugation surrounds and extends into the first corrugation.

In accordance with one presently preferred embodiment of the coupling, the first section of the coupling member includes a radially outwardly extending corrugation which defines the aforementioned internal groove for the annular sealing element and urges a part of the end portion of the second component toward the internal surface of the second tubular member when the end portion of the second component is properly inserted into the aforementioned annular space. The second tubular member can be provided with a corrugation which extends radially outwardly and spacedly surrounds the corrugation of the first section and serves to receive a part of the end portion of the second component when the end portion of the second component is received in the annular space. This further enhances the sealing engagement between the twin-walled body (including the second tubular member and the second section) and the end portion of the second component.

The aforementioned carrier of the second section of the coupling member can constitute a flat washer which has an inner and an outer marginal portion. The coupling elements are integral with and extend from one of the marginal portions in substantial parallelism with the axis of the carrier. The coupling elements and the carrier of such second section together form a one-piece blank, and the coupling elements constitute bent-over portions of such blank.

Each coupling element includes a free end portion which is remote from the first section of the coupling member (i.e., each opening is disposed between the first section and the respective free end portion), and each free end portion can be provided with a protuberance extending substantially toward the axis of the coupling member. Each protuberance can include a lug constituting a bent portion of the respective coupling element. For example, a portion of the material which is to be removed to provide a coupling element with its opening can be bent from the general plane of the respective coupling element to constitute the aforementioned protuberance or lug.

The novel features which are considered as characteristic of the invention are set forth in particular in the appended claims. The improved coupling itself, however, both as to its construction and the mode of assembling the same, together with additional features and advantages thereof, will be best understood upon perusal of the following detailed description of certain specific embodiments with reference to the accompanying drawing.

DESCRIPTION OF PREFERRED EMBODIMENTS

Figure 1:
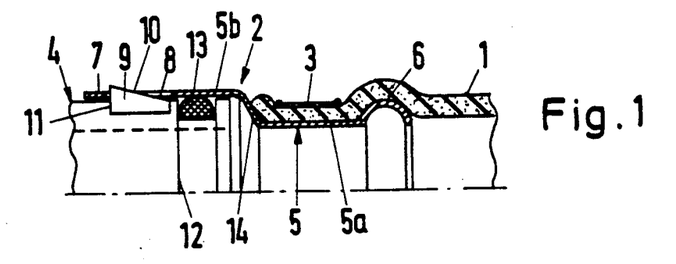
FIG. 1 is a fragmentary axial sectional view of a coupling which embodies one form of the invention and employs an annular sealing element which is receivable in the external groove of the end portion of the first tubular component.

FIG. 1 shows a coupling which serves to connect a nipple 4 at one end of a metallic or plastic pipe with the adjacent end portion of a flexible elastic hose 1. The coupling comprises an elongated sleeve-like tubular coupling member 2 (hereinafter called sleeve), a second tubular member 3 which serves as a means for biasing or urging the end portion of the hose against the external surface of a tubular first section 5a of the sleeve 2, and the annular sealing element 13 (e.g., an O-ring) which is installed in the external groove 12 of the nipple 4. The clamping member 3 is a contractible clamp which can be reduced in size by a worm type thread and a screw (see, for example, commonly owned U.S. Pat. No. 4,244,088 to Sauer) to urge the end portion of the hose 1 against the tubular section 5a of the sleeve 2. Clamping of the end portion of the hose 1 between the tubular member 3 and the section 5a of the sleeve 2 follows insertion of the section 5a into the end portion of the hose.

The sleeve 2 further includes a second section 5b which is located outwardly of the end portion of the hose 1 and is integral (of one piece) with the left-hand axial end of the section 5a. The section 5a and the tubular part of the section 5b together form a tube 5. The section 5a includes a radially outwardly extending corrugation 6 which causes the adjacent portion of the hose 1 to bulge radially outwardly. This contributes to retaining action of the tubular clamping member 3 and section 5a by ensuring that the end portion of the hose 1 cannot be extracted from the annular space between 3 and 5a. If the corrugation 6 is formed prior to insertion of the section 5a into the end portion of the hose 1, the right-hand portion of this corrugation preferably resembles a hollow conical frustum in order to facilitate insertion of the section 5a into the hose. The outer diameter of the section 5a can equal or approximate the inner diameter of the hose 1 in undeformed condition of the hose, and the inner diameter of the section 5b can equal or slightly exceed the outer diameter of the hose.

The section 5b includes the tubular portion which forms part of the tube 5 and a set of four equidistant substantially prong-shaped flexible elastic coupling elements 7 (hereinafter called prongs) each of which has an opening 8 in the form of a radially extending bore or hole serving to receive and return a discrete tooth-shaped projection 9 at the exterior of the nipple 4. The projections 9 are uniformly spaced apart from each other in the circumferential direction of the nipple 4, the same as the prongs 7. The prongs 7 are substantially coplanar with the adjacent parts of tubular portion of the section 5b (i.e., the prongs need not extend radially outwardly beyond the tube 5).

The projections 9 jointly form a composite retainer for the sleeve 2, and each of these projections has a sloping flank or ramp 10 which is inclined toward the axis of the nipple 4 in a direction toward the free end of the nipple, and a substantially radially extending flank 11. When a projection 9 enters the adjacent opening 8, the free end portion of the respective prong 7 is adjacent the radial flank 11 and thus ensures that the nipple cannot be extracted from the sleeve 2 except if the prongs are intentionally flexed radially outwardly so that their free end portions and openings 8 are disposed radially outwardly of the apices of the corresponding projections 9.

The groove 12 is provided between the four projections 9 and the free end of the nipple 4. The dimensions of the sealing element 13 in the groove 12 are selected in such a way that, when this sealing element is deformed by the section 5b of the sleeve 2, its radially outer part is in sealing engagement with the tube 5 and its radially inner part is in sealing engagement with the surface bounding the groove 12.

The sleeve 2 is made of metallic sheet material having a thickness which is less than the wall thickness of the nipple 4. However, it is also possible to make the sleeve 2 of a suitable resilient plastic material.

In order to assemble the coupling of FIG. 1, the section 5a of the sleeve 2 is inserted into the end portion of the hose 1 in a first step, and the tubular clamping member 3 is thereupon placed around the end portion of the hose so that it spacedly surrounds the section 5a. The clamping member 3 surrounds the end portion of the hose 1 in the region between the corrugation 6 and the section 5b. If desired, the clamping member 3 can be placed around the end portion of the hose 1 prior to insertion of the section 5a. The diameter of the clamping member 3 is then reduced so that the clamping member urges the end portion of the hose 1 into sealing engagement with the external surface of the section 5a.

The next step includes insertion of the nipple 4 into the section 5b in such angular position that each projection 9 is in line with one of the prongs 7. This ensures that the free end portions of the prongs ride along the respective ramps 10 and that the end portions of the prongs automatically move radially inwardly (due to innate resiliency of the prongs) as soon as the projections 9 are free to enter the adjacent openings 8. The inclination of the ramps 10 is sufficiently pronounced to cause the prongs 7 to store at least some energy while the free end portions of the prongs ride along the respective ramps 10 on their way toward the corresponding radial flanks 11.

The annular shoulder-like portion 14 of the sleeve 2 between the sections 5a and 5b abuts the free end of the nipple 4 as soon as insertion of the nipple is completed, i.e., as soon as each opening 8 receives a projection 9, so that the portion 14 constitutes a stop which limits the extent of penetration of the nipple 4 into the sleeve 2.

An advantage of the coupling which is shown in FIG. 1 is its simplicity. Furthermore, the maximum diameter of the coupling only negligibly exceeds the maximum diameter of the nipple 4; in fact, the apices of the projections 9 can extend radially outwardly beyond the radially outermost portions of the sleeve 2, clamping member 3 and hose 1 in assembled condition of the coupling. Another important advantage of the coupling is that it can stand pronounced axial stresses which tend to extract the nipple 4 from the sleeve 2, i.e., which tend to separate the tubular component including or constituted by the nipple 4 from the tubular component which is constituted by the hose 1. The tubular section 5a and its corrugation 6 cooperate with the tightened clamping member 3 to ensure that the end portion of the hose 1 cannot be extracted from the space around the section 5a, even if the hose 1 is pulled away from the nipple 4 (or vice versa) with a considerable force. The feature that the prongs 7 are provided with openings 8 for the respective projections 9 ensures that the prongs are not subjected to the action of any forces which tend to flex their free end portions radially outwardly when the nipple 4 is pulled in a direction away from the hose 1 and/or vice versa.

If it becomes necessary to detach the hose 1, the clamping member 3 is loosened so that it can be removed from the end portion of the hose and the latter is then free to slide off the section 5a of the sleeve 2 in a direction away from the nipple 4. If it is desired to leave the fluidtight connection between the hose 1 and the sleeve 2 intact but to extract the nipple 2 from the sleeve, the free end portions of the prongs 7 are flexed radially outwardly by a manually operated tool or in a machine so that the projections 9 can bypass the openings 8 on their way in a direction away from the section 5a and hose 1. The connection between the nipple 4 and the sleeve 2 can be established and terminated as often as desired. The same applies for the connection between the hose 1 and the section 5a.

The clamping member 3 can be of the type disclosed in numerous United States and foreign patents and pending patent applications of the assignee of the present application. Reference may be had, for example, to the aforementioned U.S. Pat. No. 2,244,088, to U.S. Pat. Nos. 4,300,270, 4,418,448, 4,468,840 and 4,523,352 to Sauer and to U.S. Pat. No. 4,622,719 to Rasmussen et al.

Another advantage of the improved coupling is that the provision of openings 8 in the prongs 7 entails considerable savings in the material of the sleeve 2, especially if the sleeve is made of a plastic material. The sleeve 2 can stand pronounced axial stresses without releasing the nipple 4 because the surfaces bounding the leftmost portions of the openings 8 lie flush against the respective radial flanks 11 so that the projections 9 do not tend to pivot the prongs 7 radially outwardly regardless of the magnitude of forces which are applied to extract the nipple 4 from the sleeve 2 and/or to extract the end portion of the hose 1 from the annular space between the clamping member 3 and the section 5a.

Figure 2:
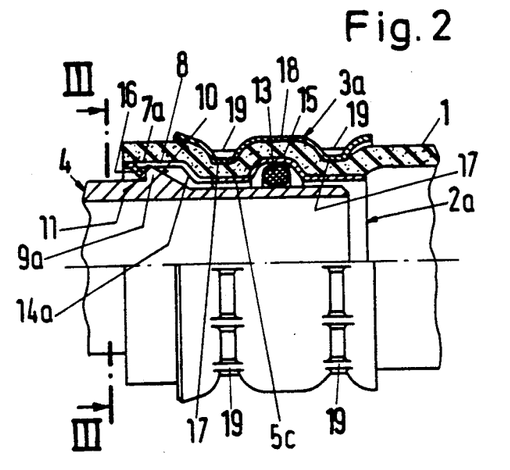
FIG. 2 is a partly elevational and partly axial sectional view of a second coupling wherein the annular sealing element is confined in an internal groove of the tubular coupling member.
Figure 3:
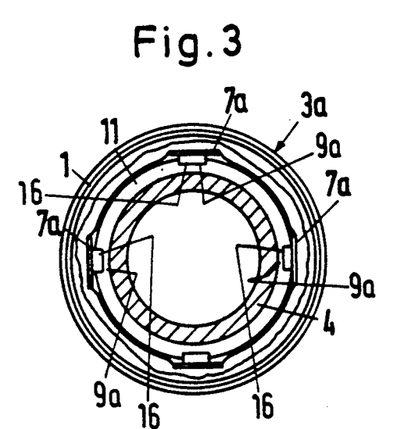
FIG. 3 is a transverse sectional view as seen in the direction of arrows from the line III—III of FIG. 2.

FIGS. 2 and 3 show a second coupling wherein the major part of or the entire sleeve 2a is confined in the end portion of the hose 1 in assembled condition of the coupling. The inner diameter of the entire sleeve 2 is greater than the outer diameter of the nipple 4. The tubular first section 5c of the sleeve 2a has a radially outwardly extending circumferentially complete corrugation 15 which clamps the end portion of the hose 1 against the internal surface of the tubular clamping member 3a and defines in the internal surface of the section 5c a circumferentially complete groove for the annular sealing element 13. This sealing element performs the function of the similarly referenced sealing element in the coupling of FIG. 1.

The free end portions of the prongs 7a of the left-hand section of the sleeve 2a (as seen in FIG. 2) are disposed at the periphery of a cylinder having a diameter greater than the outer diameter of the section 5c, and an intermediate portion 14a of each prong 7a forms a bend which connects the rightmost portion of the respective prong with the free end portion. The openings 8 of the prongs 7a serve to receive the respective projections 9a of the nipple 4. The configuration of this nipple departs from that of the nipple which is shown in FIG. 1 because the nipple of FIGS. 2–3 need not be provided with an external groove 12 for the sealing element 13.

The free end portion of each prong 7a is formed with an inwardly extending protuberance in the form of a short lug 16 which slopes radially inwardly in a direction toward the section 5c. These lugs bear against the radial flanks 11 of the respective projections 9a if an attempt is made to extract the nipple 4 from the sleeve 2a without flexing the free end portions of the prongs 7a radially outwardly beyond the apices of the corresponding projections. As the pull upon the nipple 4 increases, the inclination of the lugs 16 changes until the lugs extend substantially radially inwardly and are in full surface-to-surface contact with the respective flanks 11.

The tubular clamping member 3a is a radially inwardly squeezable or otherwise deformable tubular body which initially constitutes a cylinder capable of being slipped onto the end portion of the hose 1 prior or subsequent to insertion of the tubular section 5c of the sleeve 2a. Once it has been properly applied around the end portion of the hose 1 and the tubular section 5c in the end portion of the hose, the clamping member 3a is deformed to exhibit two axially spaced-apart radially inwardly extending corrugations 17 and a radially outwardly extending corrugation 18 between the corrugations 17. The corrugation 18 is aligned with and is disposed radially outwardly of the corrugation 15. The corrugation 15 can be formed prior to insertion of the section 5c into the end portion of the hose 1 or simultaneously with the making of corrugations 17 and 18. The making of radially inwardly extending corrugations 17 results in the formation of substantially axially parallel creases 19 which enhance the rigidity of the deformed clamping member 3a, especially its ability to resist flexing or bending stresses.

The corrugations 15, 17 and 18 cooperate to ensure that the end portion of the hose 1 is maintained in reliable sealing engagement with the tubular clamping member 3a and with the tubular section 5c of the sleeve 2a. These corrugations impart to the end portion of the hose 1 to an undulate shape which contributes to reliable retention of the hose in the illustrated axial position.

The sleeve 2a is assembled with the clamping member 3a an end portion of the hose 1, and the sealing element 13 is inserted into the groove with the corrugation 15 before the nipple 4 is introduced into the sleeve. Introduction of the nipple 4 is terminated when the lugs 16 of the prongs 7a (which are flexed radially outwardly while sliding along the ramps 10 of the respective projections 9a) advance beyond the apices of the adjacent projections so that they can move radially inwardly behind the corresponding radial flanks 11 and the projections 9a enter the openings 8 to complete the attachment of the nipple 4 to the coupling and to the end portion of the hose 1. The projections 9a of the nipple 4 which is shown in FIGS. 2 and 3 can form part of a circumferentially completed retainer at the exterior of the nipple. The prongs 7a are not curved in the circumferential direction of the nipple 4 (the prongs 7 are or can be curved in such direction) and extend substantially tangentially of the adjacent portion of the nipple (see FIG. 3).

The inner diameter of the hose 1 (in unstressed condition of the hose) is slightly smaller than the diameter of the circle including the radially outermost portions of the prongs 7a (in unstressed condition of the prongs). This ensures that the prongs 7a stretch the end portion of the hose 1 during insertion of the sleeve 2a and its prongs into the end portion of the hose. In other words, the ramps 10 of the projections 9a move the free end portions of the prongs 7a radially outwardly against the resistance (innate resiliency) of the prongs as well as against the resistance of the end portion of the hose 1 which opposes movements of the lugs 16 away from the axis of the sleeve 2a. Such dimensioning of the prongs 7a and of the end portion of the hose 1 even further reduces the likelihood of accidental separation of prongs 7a from the respective projections 9a when the coupling of FIGS. 2 and 3 is fully assembled. The elasticity of the end portion of the hose 1 is sufficiently pronounced to ensure that the hose does not offer excessive resistance to radially outward movement of the lugs 16 while the lugs ride along the respective ramps 10 toward the adjacent radial flanks 11.

The lugs 16 also contribute to reliability of the connection between the sleeve 2a and the nipple 4. As mentioned above, these lugs tend to change their orientation in response to exertion of a pull upon the nipple 4 and/or upon the hose 1 so that they move into more pronounced surface-to-surface contact with the respective flanks 11. At the same time, the lugs 16 tend to migrate toward the axis of the sleeve 2a, i.e., even further away from positions of disengagement from the respective projections 9a.

Figures 4, 5:
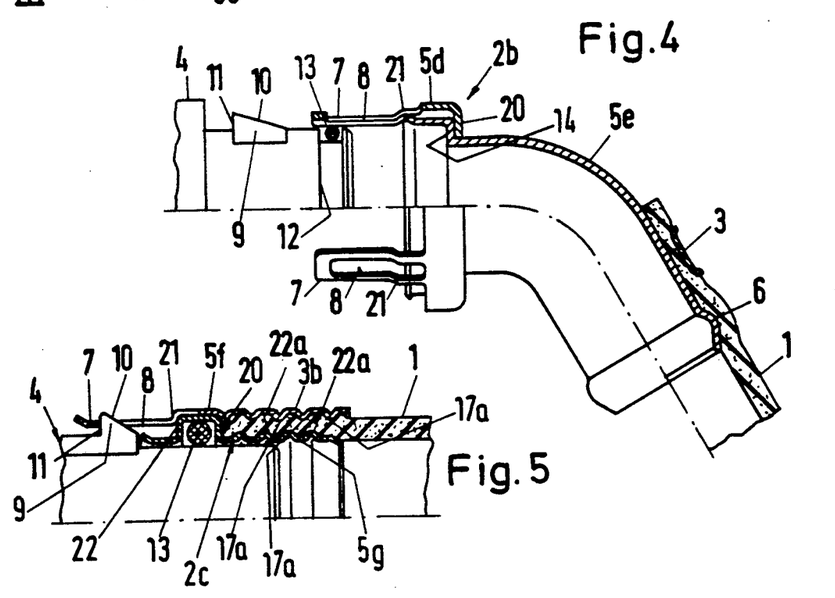
FIG. 4 is a partly elevational and partly axial sectional view of a third coupling which is designed to sealingly and separably connect two mutually inclined tubular components to each other.
FIG. 5 is a fragmentary axial sectional view of a fourth coupling constituting a modification of the coupling of FIGS. 2 and 3.

FIG. 4 shows a coupling wherein the sleeve 2b is assembled of two separately produced sections 5e and 5d which are form-lockingly connected to each other. The prongs 7 of the section 5d are similar to the prongs of the coupling which is shown in FIG. 1 and are integral with the tubular portion of this section. The section 5e has a radially outwardly extending corrugation 6 which is received in the end portion of the hose 1 inwardly adjacent a tubular clamping member 3, e.g., a clamping member of the type described in connection with FIG. 1. A portion of the section 5e is bent to ensure that the hose 1 can be properly coupled to a nipple 4 the axis of which is inclined with reference to the axis of the end portion of the hose. Such configuration of the section 5e is desirable when the space which is available for installation of the coupling is such that the nipple 4 cannot be attached to the sleeve 2b except if its axis is inclined with reference to the axis of the clamping member 3 and the end portion of the hose 1.

The means for form-lockingly connecting the outwardly extending collar 14 which is an integral part of the section 5e and is engaged by a radially inwardly extending collar 20 of the section 5d. The collars 14 and 20 are disposed at or close to that end of the section 5e which is not inserted into the hose 1. The form-locking connection further includes bent intermediate portions 21 of the prongs 7 which engage an annular bead at the left-hand end of the section 5e and cooperate with the collars 14, 20 to ensure that the sections 5d, 5e are held against axial movement relative to each other. The collar 14 can be said to form part of a radially outwardly extending rudimentary corrugation of the section 5e, and such corrugation extends into the corrugation which is formed by the bent portions 21 of the prongs 7 and the collar 20 of the section 5d.

An advantage of the composite sleeve 2b is that its sections 5d and 5e can be made of different materials. For example, the section 5d can be made of a resilient metallic material and the section 5e can be made of a less expensive slightly resilient, non-resilient or ductile metallic or plastic material. It is also possible to make the section 5d of a resilient plastic material and to make the section 5e of a resilient or ductile metallic material.

The mode of assembling the coupling of FIG. 4 is analogous to the aforedescribed mode of assembling the coupling of FIG. 1.

Referring to FIG. 5, there is shown a portion of a coupling wherein the sleeve 2c is also made of two separately produced sections 5f and 5g which are form-lockingly connected to each other. The section 5f includes an annular portion which is integral with the axially parallel prongs 7, and the major portion of the sleeve 5g extends into the end portion of the hose 1. The section 5f is analogous to the section 5d of the sleeve 2b; its corrugation including the radially inwardly extending collar 20 and the bends 21 of the prongs 7 surrounds a circumferentially complete radially outwardly extending corrugation 22 of the section 5g. The corrugation 22 defines in the internal surface of the section 5g a circumferentially complete annular groove for the sealing element 13 which engages the external surface of the nipple 4 in assembled condition of the coupling.

The section 5g is further provided with several additional corrugations 22a which are surrounded by the end portion of the hose 1 and cooperate with corrugations 17a of the deformable clamping member 3b to ensure that the end portion of the hose 1 is reliably held in the illustrated axial position in which it fills the annular space between the section 5g and the clamping member 3b.

The section 5f can be made of a resilient metallic material, and the section 5g can be made of a slightly resilient, non-resilient or ductile metallic or plastic material. It is presently preferred to make the section 5g of a relatively inexpensive metallic material which exhibits little or no resiliency.

Figure 6:
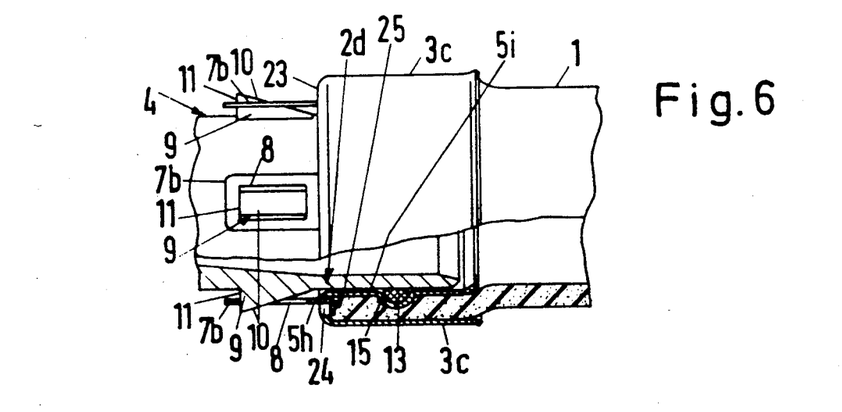
FIG. 6 is a partly elevational and partly axial sectional view of a fifth coupling.
Figure 7:
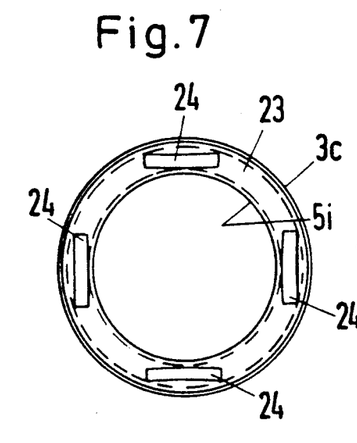
FIG. 7 is an end elevational view of a twin-walled body which is used in the coupling of FIG. 6 and includes a first section of the tubular coupling member.

FIG. 6 shows a coupling with a composite sleeve 2d having a tubular first section 5i in the end portion of the hose 1 and a tubular or annular second section 5h which is form-lockingly connected with the section 5i. The latter is integral with a tubular clamping member 3c and defines therewith an annular space for the end portion of the hose 1. The left-hand axial end of the section 5i is integrally connected with the left-hand axial end of the clamping member 3c by a radially extending wall 23 (see particularly FIG. 7) which has a set of apertures in the form of arcuate slots 24.

The section 5h includes a washer-like or disc-shaped carrier 25 (see particularly FIGS. 8 and 9) for four equidistant prongs 7b extending at right angles to the plane of the carrier and in parallelism with the axis of the sleeve 2d. The carrier 25, the wall 23 and those portions of the prongs 7b which are integral with the inner marginal portion of the carrier 25 constitute the means for form-lockingly connecting the sections 5h and 5i to each other. To this end, the carrier 25 is introduced into the annular space between the section 5i and the clamping member 3c so that it is adjacent the inner side of the wall 23 and that the projections 7b extend through and beyond the respective apertures 24. The carrier 25 can be held against movement away from the inner side of the wall 23 by the properly inserted and clamped end portion of the hose 1 which preferably fills the annular space between the wall 23, clamping member 3c and section 5i.

The section 5i has a radially outwardly extending corrugation 15 which defines an internal groove for the annular sealing element 13. The corrugation 15 cooperates with the clamping member 3c to prevent extraction of the end portion of the hose 1.

Figure 8:
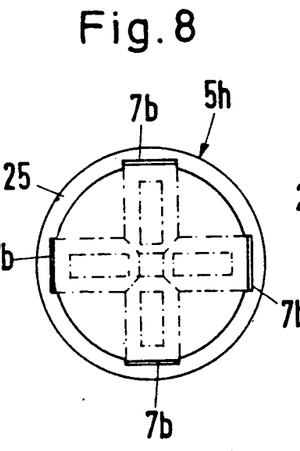
FIG. 8 is a front elevational view of the second section of the coupling member which is used in the coupling of FIG. 6.
Figure 9:
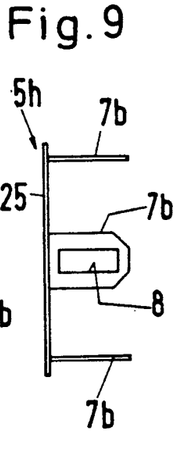
FIG. 9 is a side elevational view of the second section which is shown in FIG. 8.

The section 5h can be made from a stamped or otherwise formed flat blank of thin metallic sheet material Initially, the prongs 7b are coplanar with and extend radially inwardly from the inner marginal portion of the carrier 25. This is indicated in FIG. 8 by phantom lines. The prongs 7b are thereupon bent through angles of approximately or exactly 90° to assume the positions which are shown in FIG. 9, namely in which they extend at right angles to the plane of the carrier and in parallelism with the axis of the sleeve 2c when the section 5h is form-lockingly connected with the section 5i. An advantage of the just described mode of making the section 5h is that very little material is wasted, namely only the four sector-shaped portions of the blank between the radially inwardly extending prongs 7.

The twin-walled body which includes the section 5i and the tubular clamping member 3c is preferably formed in a press or in a like machine as a result of cold flow of the metallic or plastic material of which the twin-walled body is made. Such procedures are well known and can be carried out in available machines.

The coupling of FIG. 6 is assembled as follows:

The washer-like carrier 25 of the section 5h is inserted into the annular space between the section 5i and clamping member 5c so that it is adjacent the inner side of the wall 23 and the prongs 7b project through the respective apertures 24. The end portion of the hose 1 is then introduced into the annular space to maintain the carrier 25 close to or in abutment with the wall 23, and the section 5i is then provided with the corrugation 15 to prevent extraction of the end portion of the hose 1 from the annular space between 5i and 3c. The corrugation 15 can be rolled into the section 5i by one or more rolling elements in a suitable machine. If desired, the clamping member 3c can be provided with one or more corrugations (e.g., with corrugations of the type shown on the clamping member 3a of FIG. 2) in order to further reduce the likelihood of extraction of the end portion of the hose 1 from the annular space between the parts 5i and 3c.

The corrugation 15 can be omitted, or need not contain a sealing element 13, if the sealing element is inserted into an external groove (note the groove 12 in FIG. 1) of the nipple 4. Of course, the corrugation 15 will be omitted only if the coupling of FIG. 6 is provided with other means for reliably retaining the end portion of the hose 1 between the section 5i and clamping member 3c.

Figure 10:
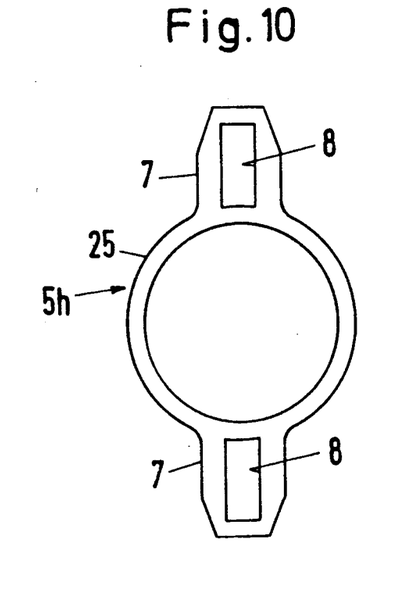
FIG. 10 is a front elevational view of a blank which can be converted into a second section constituting a modification of the second section shown in FIGS. 8 and 9.
Figure 11:
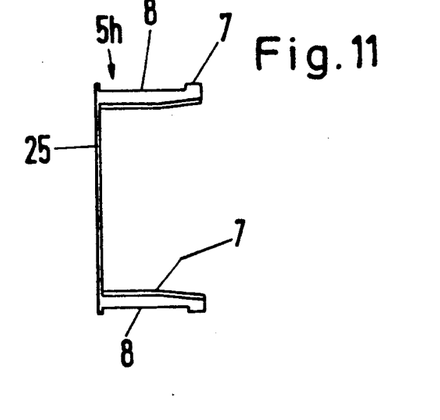
FIG. 11 is a side elevational view of the modified second section.

FIGS. 10 and 11 show a modified section 5h which can be used in lieu of the similarly referenced section in the coupling of FIG. 6. This modified second section 5h also comprises a washer-like carrier 25 for a plurality of prongs 7 which extend from its outer marginal portion and are ultimately bent to assume the positions which are shown in FIG. 11, i.e., at right angles to the plane of the carrier 25 and in substantial parallelism with the axis of the composite sleeve 2d which employs the modified section 5h. The unfinished section 5h of FIG. 10 is a flat blank of resilient metallic or plastic sheet material which is thereupon converted into the finished section of FIG. 11. It is clear that the blank of FIG. 10 can be provided with three or more preferably equidistant prongs 7.

An advantage of the modified section 5h of FIGS. 10 and 11 is that the length of the prongs 7 is not dependent upon the diameter of the carrier 25 because these prongs initially extend radially outwardly from the other marginal portion of the carrier. In the blank of FIG. 8, the length of a prong 7b cannot exceed the radius of the carrier 25. The length of each of the two prongs 7 which are shown in FIGS. 10 and 11 can greatly or at least slightly exceed the radius of the respective carrier 25.

Figure 12:
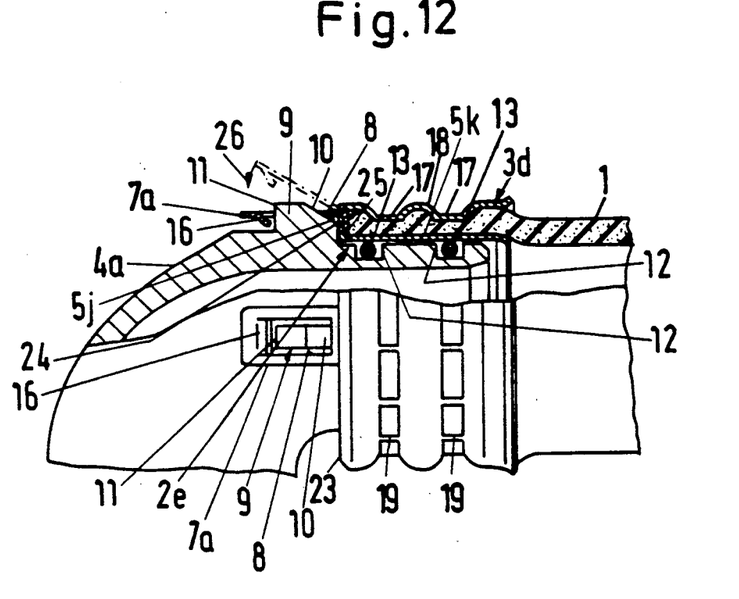
FIG. 12 is a partly elevational and partly axial sectional view of a sixth coupling constituting a modification of the coupling which is shown in FIG. 4.

The coupling which is shown in FIG. 12 serves to establish a separable fluidtight connection between the end portion of a hose 1 and an elbow-shaped nipple 4a at one end of a metallic or plastic pipe or on a container for a flowable medium. The projections 9 at the exterior of the nipple 4a are not equidistant from each other. This nipple has a first projection 9 at the twelve o'clock position, a second projection at the three o'clock position and a third projection at the nine o'clock position (as seen from the left-hand side of FIG. 12). There is no projection in the region of the smallest radius of curvature of the nipple 4a. However, a large-diameter nipple 4a can be provided with four or more equidistant or otherwise distributed projections 9.

The sleeve 2e of the coupling which is shown in FIG. 12 comprises a tubular first section 5k which is received in the end portion of the hose 1 and an annular second section 5j which is form-lockingly connected with the section 5k in a manner as described in connection with FIG. 5. The clamping member 3d is made of deformable metallic or plastic material and is integral with the section 5k.

The section 5j is made of a ductile material so that the prongs 7a of this section must be bent radially outwardly (note the phantom-line position of the uppermost prong 7a in FIG. 12) before the nipple 4a is introduced into the sleeve 2e. This entails a reduction of the effort which must be exerted in order to insert the nipple 4a because the free end portions of the prongs 7a need not slide along the ramps 10 of the respective projections 9. In fact, these projections can be replaced with simpler projections having radially extending flanks in lieu of the ramps 10. The prongs 7a extend through apertures 24 which are provided in the wall 23 between the left-hand axial ends of the clamping member 3d and section 5k.

When the insertion of the nipple 4a is completed, the prongs 7a are flexed so that their lugs 16 are moved inwardly behind the radial flanks 11 of the respective projections 9 to thus complete the assembly of the coupling. At such time, each projection 9 extends into and preferably radially outwardly beyond the respective opening 8. The direction in which the topmost ductile prong 7a of FIG. 12 must be flexed in order to move its lug 16 behind the respective flank 11 is indicated by an arrow 26.

An advantage of the sleeve 2e is that its section 5j can be made of relatively inexpensive ductile material. This simplifies the making of the section 5j. The material of the section 5j may but need not be the same as that of the twin-walled body including the section 5k and the clamping member 3d.

The section 5k is basically a straight cylinder because the sealing elements 13 are inserted into two grooves 12 which are provided in the external surface of the nipple 4a.

Figure 13:
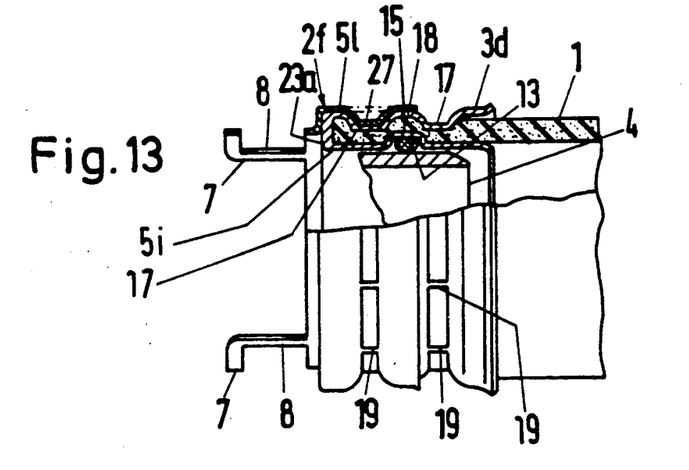
FIG. 13 is a partly elevational and partly axial sectional view of a seventh coupling.

Referring to FIG. 13, there is shown a coupling wherein the sleeve 2d includes a first section 5l which is integral with the tubular clamping member 3d, and a second section 5i which is form-lockingly connected with the section 5l. The end portion of the hose 1 is clamped between the section 5l and the clamping member 3d. The latter is deformable and is formed with radially inwardly extending corrugations 17 flanking a radially outwardly extending corrugation 18 which spacedly surrounds the radially outwardly extending corrugation 15 of the section 5l. The corrugation 15 defines an internal groove for the sealing element 13.

The form-locking connection between the sections 5f and 5l include the clamping member 3d (which is integral with the section 5l) and a radially inwardly extending corrugation 27 provided in the tubular portion of the section 5i and extending into the adjacent corrugation 17. The wall 23a between the section 5l and the clamping member 3d need not be provided with apertures because the section 5i surrounds the clamping member (i.e., it need not extend into the annular space for the end portion of the hose 1).

The prongs 7 of the section 5i are arched in the circumferential direction of the sleeve 2f, the same as the prongs 7 which are shown in FIG. 1.

The clamping member 3d is a straight cylinder during insertion of the end portion of the hose 1 into the space around the section 5l. The member 3d is thereupon deformed to exhibit the corrugations 17 and 18. These corrugations are formed simultaneously with the corrugation 27 of the section 5i.

The section 5i can be modified in that its prongs can be flat, i.e., they can be disposed in planes which are substantially tangential to the external surface of the nipple 4.

The corrugation 15 can be formed prior or subsequent to insertion of the section 5l into the end portion of the hose 1.

Figure 14:
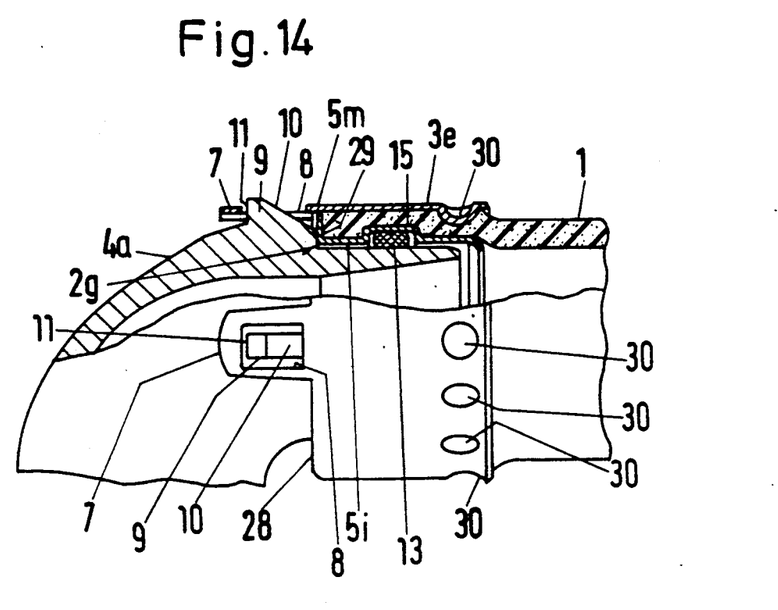
FIG. 14 is a partly elevational and partly axial sectional view of an eighth coupling.
Figure 15:
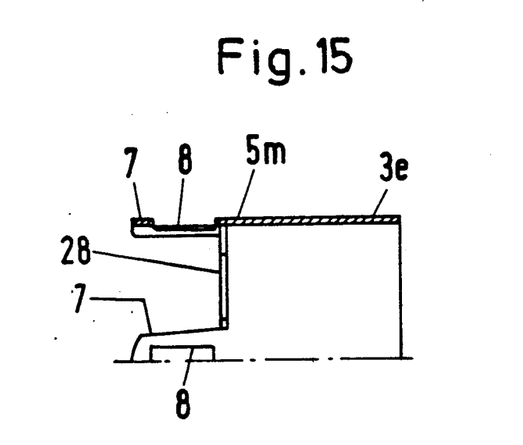
FIG. 15 is a fragmentary axial sectional view of the second section of the coupling member which is used in the coupling of FIG. 14.
Figure 16:
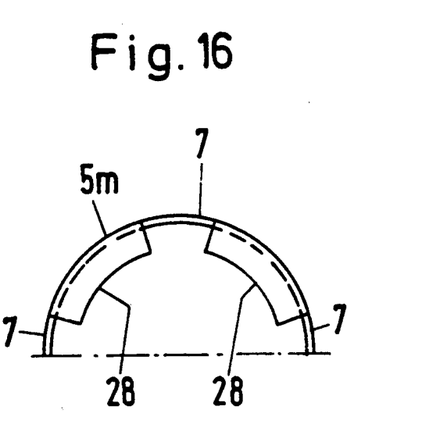
FIG. 16 is a fragmentary end elevational view of the second section which is shown in FIG. 15.

The coupling of FIG. 14 is used to fluidtightly and separably connect the end portion of the hose 1 with an elbow-shaped nipple 4a. This nipple has three projections 9 in a distribution as described in connection with FIG. 12. The sleeve 2g of this coupling has a first section 5i which is received in the end portion of the hose 1 and a second section 5m which is integral with the clamping member 3e. The member 3e is made of a ductile material and is provided with an interrupted corrugation composed of an annulus of equidistant or non-uniformly spaced-apart notches or depressions 30 which ensure that the end portion of the hose 1 is reliably clamped between the member 3e and the section 5i. The means for form-lockingly connecting the sections 5i and 5m to each other comprises the end portion of the hose 1 which is clamped between the section 5i and the member 3e. In addition, the form-locking connection includes arcuate flaps 28 (note FIGS. 15 and 16) which are integral with and extend inwardly from the section 5m between the prongs 7 and the clamping member 3e to abut the radially outwardly extending collar 29 at the respective axial end of the section 5i. The flaps 28 alternate with the prongs 7 in the circumferential direction of the sleeve 2g.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for separably and fluidtightly connecting an end portion of a fist tubular component wherein the end portion has a plurality of external projections having substantially radially extending flanks with an end portion of a second tubular component, particularly for connecting a nipple at one end of a pipe with an end portion of a flexible hose, comprising a one-piece tubular coupling member including a tubular first section insertable into the end portion of the second component and a second section including a plurality of flexible coupling elements each having an opening for reception and retention of a projection in response to insertion of the end portion of the first component into said coupling member, said coupling elements being substantially parallel to the axis of said second section and said second section including an annular portion integral with said coupling elements; means for urging the end portion of the second component into sealing engagement with the exterior of said first section; and an annular sealing element disposed within said coupling member and arranged to sealingly engage said coupling member and the exterior of the end portion of the first component on insertion of the end portion of the first component section into said coupling member.

2. The coupling of claim 1, wherein said coupling elements are made of a ductile material and are flexible in directions toward and away from the axis of said coupling member.

3. The coupling of claim 1, wherein each of said coupling elements includes a free end portion and said openings are disposed between said end portions and said first section, each of said free end portions including a protuberance extending substantially toward the axis of said coupling member.

4. The coupling of claim 3, wherein said protuberances include lugs constituting bent portions of the respective coupling elements.

5. A coupling for separably and fluidtightly connecting an end portion of a first tubular component wherein the end portion has a plurality of external projections with an end portion of a second tubular component, particularly for connecting a nipple at one end of a pipe with an end portion of a flexible hose, comprising a tubular coupling member including a tubular first section insertable into the end portion of the second component and a second section including a plurality of flexible coupling elements each having an opening for reception and retention of a projection in response to insertion of the end portion of the fist component into said coupling member, said sections of said coupling member constituting separately produced parts and said coupling member further comprising means for connecting said sections to each other, said connecting means comprising complementary first and second corrugations respectively provided on said first and second section, one of said corrugations being received within the other of said corrugations; and means for urging the end portion of the second component into sealing engagement with the exterior of said first section.

6. The coupling of claim 5, wherein said connecting means includes means for form-lockingly connecting said sections to each other.

7. The coupling of claim 5, wherein one of said first and second corrugations defines in the respective section an internal annular groove and further comprising an annular sealing element disposed in said groove and arranged to sealingly engage the exterior of the end portion of the first component in response to insertion of the end portion of the first component into said coupling member.

8. The coupling of claim 7, wherein said groove is provided in said first section of said coupling member.

9. A coupling for separably and fluidtightly connecting an end portion of a first tubular component wherein the end portion has a plurality of external projections with an end portion of a second tubular component, particularly for connecting a nipple at one end of a pipe with an end portion of a flexible hose, comprising a one-piece tubular coupling member including a tubular first section insertable into the end portion of the second component and a second section insertable over the end portion of the second component and including a plurality of flexible coupling elements each having an opening for reception and retention of a projection in response to insertion of the end portion of the first component into said coupling member; and means for urging the end portion of the second component into sealing engagement with the exterior of said first section.

10. A coupling for separably and fluidtightly connecting an end portion of a first tubular component wherein the end portion has a plurality of external projections with an end portion of a second tubular component, particularly for connecting a nipple at one end of a pipe with an end portion of a flexible hose, comprising a tubular coupling member including a tubular first section insertable into the end portion of the second component and a second section including a plurality of flexible coupling elements each having an opening for reception and retention of a projection in response to insertion of the end portion of the first component into said coupling member; and means for urging the end portion of the second component into sealing engagement with the exterior of said first section, including a second tubular member which is of one piece with and defines said first section an annular space for the end portion of the second component.

11. The coupling of claim 10, wherein said second tubular member has a first and a second axial end and said first section has a first axial end adjacent the first axial end of said second tubular member and a second axial end, and further comprising a wall extending substantially radially of said coupling member and being integral with the first axial ends of said second tubular member and said first section, said wall having apertures and said second section including a substantially disc-shaped carrier disposed in said annular space adjacent said wall and integral with said coupling elements, said coupling elements extending through and beyond the apertures of said wall.

12. The coupling of claim 11, wherein said second tubular member and said first section include means for sealinly engaging the end portion of the second component upon insertion of the end portion of the second component into said annular space so that the end portion of the second component then maintains said carrier at said wall.

13. A coupling for separably and fluidtightly connecting an end portion of a first tubular component wherein the end portion has a plurality of external projections with an end portion of a second tubular component, particlarly for connecting a nipple at one end of a pipe with an end portion of a flexible hose, comprising a tubular coupling member including a tubular first section insertable into the end portion of the second component and a second section including a plurality of flexible coupling elements each having an opening for reception and retention of a projection in response to insertion of the end portion of the first component into said coupling member; and means for urging the end portion of the second component into sealing engagement with the exterior of said first seciton, said urging means including a second tubular member which surrounds and is of one piece with said first section, said second section and said second tubular member having complementary corrugations and one of said corrugations being received in the other of said corrugations.

14. The coupling of claim 13, wherein the corrugation of said second section surrounds and extends into the corrugation of said second tubular member.

15. A coupling for separably and fluidtightly connecting an end portion of a first tubular component wherein the end portion has a plurality of external projections with an end portion of a second tubular component, particularly for connecting a nipple at one end of a pipe with an end portion of a flexible hose, comprising a tubular coupling member including a tubular first section insertable into the end portion of the second component and a second section including a plurality of flexible coupling elements each having an opening for reception and retention of a projection in response to insertion of the end portion of the first component into said coupling member; means for urging the end portion of the second component into sealing engagement with the exterior of said first section, said urging means including a second tubular member which spacedly surrounds said first section; an annular wall of one piece with said second tubular member and said first section so that said wall, said second tubular member and said first section jointly define an annular space for the end portion of the second component, said first section having a radially outwardly extending corrugation arranged to bias the end portion of the second component against said second tubular member and defining in said first section a circumferentially complete internal annular groove; and an annular sealing element provided in said groove and arranged to sealingly engage the exterior of the end portion of the first component on insertion of the end portion of the first component into said coupling member.

16. The coupling of claim 15, wherein said second tubular member has a radially outwardly extending corrugation which spacedly surrounds the corrugation of said first section to receive a part of the end portion of the second component upon insertion of the end portion of the second component into said annular space.

* * * * *